Oct. 19, 1937.  R. L. FULTON  2,096,238

GUARD AND LEDGER PLATE FOR MOWING MACHINES OR LIKE

Filed Aug. 27, 1936

INVENTOR.
R. L. FULTON
BY M. Talbert Dick
ATTORNEY.

Patented Oct. 19, 1937

2,096,238

UNITED STATES PATENT OFFICE 2,096,238

GUARD AND LEDGER PLATE FOR MOWING MACHINES OR LIKE

Robert L. Fulton, Webster City, Iowa

Application August 27, 1936, Serial No. 98,134

1 Claim. (Cl. 56—311)

The principal object of my invention is to provide a combination mower guard and easily removable and replaceable ledger plate.

A further object of this invention is to provide a mower guard having a ledger plate that, when once secured in position on the guard is rigid and which permits the removal of the guard and plate from the mower and the plate from the guard by the removal of a single bolt.

A still further object of my invention is to provide a mower guard and ledger plate that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Figure 1:
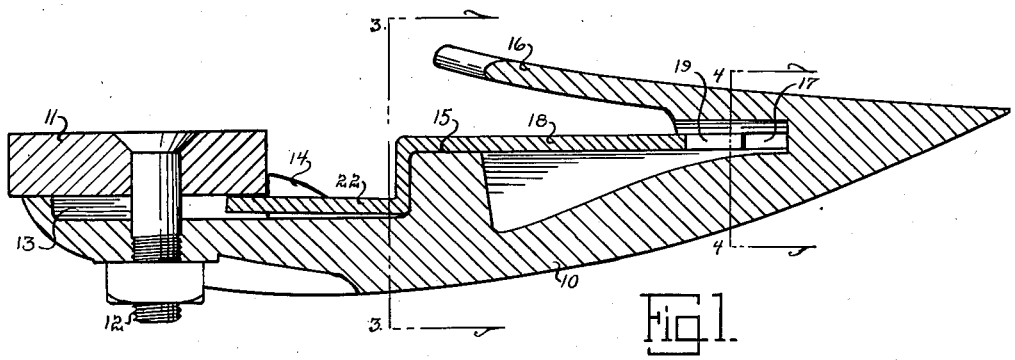
Fig. 1 is a side sectional view of my mower guard with the ledger plate secured in place.

The ordinary sickle guard for mowing machines has the ledger plate securely riveted to the guard in such a way that it can not be easily removed even by a skilled workman. Because of this the complete guard and ledger plate unit is usually thrown away and a new one substituted. The ledger plate is of relatively simple construction and is cheap to manufacture, however, the guard is more complicated to manufacture and does not have any material wear imposed upon it when the machine is in operation. Consequently one of the guards could outlast an innumerable number of ledger plates. A user is reluctant to throw away the old guard when the plate becomes dull and consequently uses the ledger plate beyond its useful efficient life and the throwing away of the guard is merely an economic waste. Obviously there are many guards on a sickle bar assembly. Furthermore, the ledger plates now in use become loosened through wear and no provision is made for tightening these plates except by re-crimping the rivets, often resulting in the breakage of the guard as the guards are generally constructed of a cast metal. I have overcome these disadvantages as will be appreciated and as is hereinafter set forth.

Referring to the drawing I have used the numeral 10 to designate the base portion of my device guard portion which is of the same substantial contour as the mower guards now in use.

The numeral 11 designates the usual guard bar of a mowing machine to which the rear end of the guards 10 are secured by a bolt or like 12. The rear upper side of the guard 10 has formed therein a recess 13 as shown in Fig. 1 of the drawing.

The numeral 14 designates two spaced apart lugs integrally formed on the upper surface of the guard 10 which have their rearward faces vertical to contact the forward edge of the guard bar 11 in the usual manner. The numeral 15 designates a step or raised portion of the guard which forms a table to receive a ledger plate. The numeral 16 designates the usual upwardly and rearwardly extending fender as shown in Fig. 1 of the drawing. The numeral 17 designates a guide recess formed in the forward part of the guard in prolongation of the plane, and forward of, the table 15 as shown in Fig. 1 of the drawing.

Figure 2:
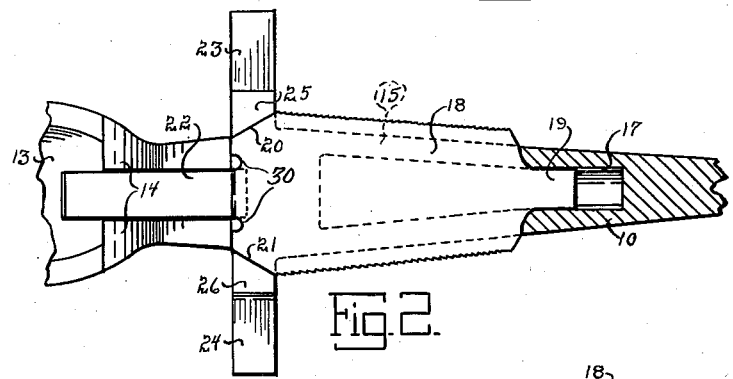
Fig. 2 is a top sectional view of my device and more fully illustrates its construction.
Figure 5:
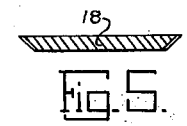
Fig. 5 is a cross-sectional view of the ledger plate of my device.

I have used the numeral 18 to designate my ledger plate having a tongue 19 formed on its forward end capable of entering and engaging the guide recess 17. This plate 18 has the usual upwardly and outwardly extending cutting serrations along its side marginal edges, is wider at its rearward end and has diagonal shoulders 20 and 21 formed thereon as shown in Fig. 2. It is upon the plate 18 that the usual reciprocating sickle blade of the mower rides when cutting. Integrally formed on the rear central portion of the plate 18 is a tang 22 which is bent downwardly the distance of the step 15 and thence rearwardly and upwardly, extending between the lugs 14 and into the recess 13 where it is clamped under the bar 11 as shown in Fig. 1.

Figures 3, 6:
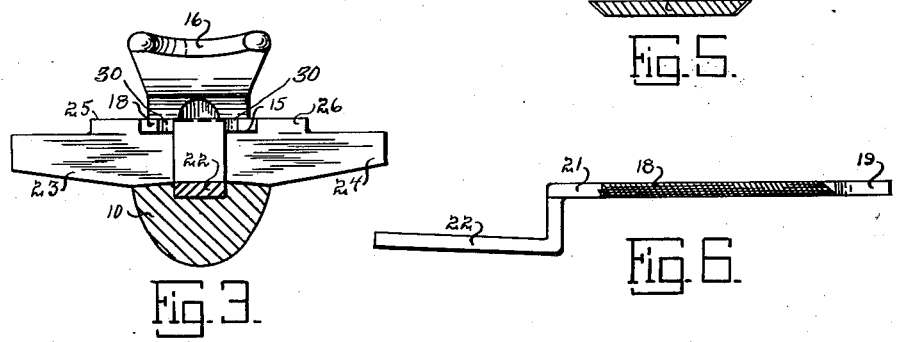
Fig. 3 is a cross-sectional view of my device taken on the line 3—3 of Fig. 1.
Fig. 6 is a side plan view of the ledger plate of my device.
Figure 4:
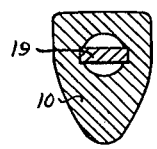
Fig. 4 is a cross-sectional view of my guard and plate taken on the line 4—4 of Fig. 1.

The numerals 23 and 24 designate the usual two common spacer arms extending at right angles to the vertical section of the guard 10. The ends of these spacer arms contact the ends of the adjacent spacer arms on other guards in the mower as will be appreciated by those familiar with mowers. Integrally formed on the inner ends of these arms 23 and 24 are the shoulders 25 and 26 respectively which have a diagonal inner face for supporting the shoulders 20 and 21 respectively of the plate 18. It will be here noted that the vertical face of the step 15 is channeled to receive the downwardly extending portion of the tang 22 as shown by dotted lines in Fig. 2 and that the rearwardly extending portion of the tang also rests in a channel in the guard 10 as shown in Fig. 3. In order that the tang 22 can be properly bent downwardly from the portion 18, the portion 18 is cut away at each side of the root of the tang as shown in Fig. 2 to form recessed notches 30.

The practical operation of my device is as follows: When the cutting edge of the plate 18 has dulled, the nut is removed from the bolt 12 and the guard removed. The ledger plate is then lifted out and discarded. A new blade is then inserted as follows: The tongue 19 is inserted in the guide recess 17 and the plate 18 is in contact with the table 15, the shoulders 20 and 21 are in contact with the shoulders 25 and 26 respectively, thus preventing movement of the plate in any but an upward direction. The tang 22 lies in the channel in the guard and between the lugs 14. The rearwardly extending portion of the tang 22 extends upwardly so that its rearward end is above the upper face of the rear end of the guard 12 to the rear of the lugs 14. The guard is then put in place on the guard bar 11, the bolt 12 passed through the bar 11 and guard 10 and the nut placed on the bolt and tightened. This action springs the tang 22 downwardly and, as the tongue 19 is secure in the recess 17, tightly holds the plate 18 in position, and prevents movement of the plate in any direction.

From the foregoing it will be seen that I have provided a mower guard wherein the easily detachable ledger plate is secured to the guard by the same means that the guard is secured to the mower. Thus by removing the guard 10 from the bar 11, the plate 18 is freed and can be merely lifted from the guard and replaced or cleaned.

Also the ledger plate remains in rigid alignment on the guard, is economical in manufacture and the ledger plate can be replaced innumerable times thus saving the guard and, due to the small cost of the ledger plate, the user may replace them often and obtain greater efficiency from his mower.

My device may be used on all types of apparatus using a sickle mowing machine, such as ordinary mowing machines, binders, combines and like.

Some changes may be made in the construction and arrangement of my improved guard and cutting plate for mowing machines or like without departing from the real spirit and purpose of my invention, and it is my intention to cover by my claim any modified forms of structure or use of mechanical equivalents which may be reasonably included within its scope.

I claim:

In a device of the class described, a guard designed to be secured near its rearward end portion to a guard bar of a mowing apparatus, a raised surface on said guard forward of its rearward portion, oppositely extending spacer arms on said guard near the rear portion of said raised surface of said guard, a shoulder element on the inner end of each of said spacer arms having its inside face extending forwardly and outwardly, a recess forward of the raised surface of said guard, a ledger plate designed to rest on said raised surface having its rear end portions conforming with and contacting said shoulders on said spacer arms, a tongue on the forward end of said ledger plate entering and engaging said recess, a tang integrally formed on the rearward end of said ledger plate extending first downwardly from said raised surface and then rearwardly and upwardly to a position between the upper surface of said guard and the under surface of said guard bar of said mowing apparatus, a means for securing said guard to said guard bar with said tang between the same and under tension, and a cut out portion in said ledger plate at each side of said tang where said tang is integrally formed with said plate whereby said tang may extend directly downwardly forward of the rear plane of said ledger plate.

ROBERT L. FULTON.